US008675486B2

(12) United States Patent
Friedman et al.

(10) Patent No.: US 8,675,486 B2
(45) Date of Patent: Mar. 18, 2014

(54) METHOD AND SYSTEM FOR EFFICIENT FLOW CONTROL IN A SPOT BEAM SATELLITE SYSTEM

(75) Inventors: Daniel Friedman, Silver Spring, MD (US); Robert Torres, New Market, MD (US); Patrick Stevens, Mt. Airy, MD (US); Craig Schweinhart, Rockville, MD (US); Mangala Kannan, Potomac, MD (US); Deepak Arur, McLean, VA (US); Peter Lin, North Potomac, MD (US); Matthew Butehorn, Mt. Airy, MD (US); Ken Burrell, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 1818 days.

(21) Appl. No.: 11/130,985

(22) Filed: May 17, 2005

(65) Prior Publication Data

US 2006/0262724 A1 Nov. 23, 2006

(51) Int. Cl.
  *H04J 1/16* (2006.01)
  *H04L 1/00* (2006.01)
  *H04B 7/185* (2006.01)
  *H04L 12/28* (2006.01)
  *H04W 4/00* (2009.01)

(52) U.S. Cl.
  USPC ............ 370/235; 370/316; 370/413; 455/427

(58) Field of Classification Search
  CPC . H04L 47/10; H04L 47/6215; H04L 47/2441; H04L 47/39; H04L 47/215; H04W 84/06
  USPC ......... 370/235, 412, 413, 316, 321, 322, 323, 370/325, 395.41, 395.42, 468; 455/428, 455/427, 421, 12.1, 430, 455, 429, 3.01, 455/3.02, 13.2, 13.3
  See application file for complete search history.

(56) References Cited

U.S. PATENT DOCUMENTS

| 5,812,545 | A  | * | 9/1998 | Liebowitz et al. | 370/337 |
| 5,926,458 | A  | * | 7/1999 | Yin | 370/230 |
| 6,182,094 | B1 | * | 1/2001 | Humpleman et al. | 715/234 |
| 6,338,131 | B1 | * | 1/2002 | Dillon | 712/201 |
| 6,366,761 | B1 | * | 4/2002 | Montpetit | 455/12.1 |
| 6,445,707 | B1 | * | 9/2002 | Iuoras et al. | 370/395.43 |
| 6,449,265 | B1 | * | 9/2002 | Prieto, Jr. | 370/329 |
| 6,449,267 | B1 | * | 9/2002 | Connors | 370/347 |
| 6,522,635 | B1 | * | 2/2003 | Bedwell | 370/314 |
| 6,553,568 | B1 | * | 4/2003 | Fijolek et al. | 725/111 |
| 6,574,794 | B1 | * | 6/2003 | Sarraf | 725/63 |
| 6,654,344 | B1 | * | 11/2003 | Toporek et al. | 370/230 |

(Continued)

*Primary Examiner* — Ayaz Sheikh
*Assistant Examiner* — Hoang-Chuong Vu
(74) *Attorney, Agent, or Firm* — Potomac Technology Law, LLC (57) ABSTRACT

An approach for providing flow control in a radio communication system is disclosed. A request from a non-satellite system specific side of a transport interface is made to a system specific side of the transport interface for a flow control allocation that specifies an amount of data to be stored in a queue of the system specific side of the transport interface. The system specific side supports a signaling function that is based on a transmission characteristic of the radio communication system. The flow control allocation is generated based upon availability of the queue, wherein the destination address is a link layer address of the satellite communication system. This arrangement has particular applicability to a satellite network (e.g., Very Small Aperture Terminal (VSAT) network) that provides data communication services.

29 Claims, 6 Drawing Sheets

(56) References Cited

U.S. PATENT DOCUMENTS

| | | | |
|---|---|---|---|
| 6,707,800 B1 * | 3/2004 | Peyrovian et al. | 370/310.1 |
| 6,842,437 B1 * | 1/2005 | Heath | 370/322 |
| 6,947,445 B1 * | 9/2005 | Barnhart | 370/468 |
| 6,950,395 B1 * | 9/2005 | Bashandy et al. | 370/230.1 |
| 6,961,539 B2 * | 11/2005 | Schweinhart et al. | 455/12.1 |
| 6,996,103 B1 * | 2/2006 | Franco | 370/390 |
| 6,999,432 B2 * | 2/2006 | Zhang et al. | 370/328 |
| 7,027,394 B2 * | 4/2006 | Gupta et al. | 370/230.1 |
| 7,027,414 B2 * | 4/2006 | Walsh et al. | 370/316 |
| 7,136,620 B2 * | 11/2006 | Wang | 455/13.1 |
| 7,272,149 B2 * | 9/2007 | Bly et al. | 370/414 |
| 2001/0021901 A1 * | 9/2001 | Ellis et al. | 703/8 |
| 2002/0085589 A1 * | 7/2002 | Dravida et al. | 370/503 |
| 2003/0035385 A1 * | 2/2003 | Walsh et al. | 370/316 |
| 2003/0123394 A1 * | 7/2003 | Neale et al. | 370/235 |
| 2005/0207386 A1 * | 9/2005 | Schiff | 370/345 |
| 2006/0104299 A1 * | 5/2006 | Vazquez Castro | 370/412 |

* cited by examiner

METHOD AND SYSTEM FOR EFFICIENT FLOW CONTROL IN A SPOT BEAM SATELLITE SYSTEM

FIELD OF THE INVENTION

The present invention relates to a communications system, and more particularly to flow control.

BACKGROUND OF THE INVENTION

In a communications system, flow control regulates the flow of communications traffic from one stage of the communications system to another stage. This other, or second, stage may not always, or even ever, be able to accept such traffic from the first stage at the maximum possible discharge rate by the first stage towards the second stage. The flow control mechanism Xensures that a source of a dataflow does not overwhelm a destination, which could occur by the source transmitting data to the destination at a rate exceeding that which the destination can process. If the destination were to be overwhelmed in such fashion, data would be lost, and additional network bandwidth would be consumed for any necessary retransmissions. Satellite communication systems face the added challenge of delay stemming from signal propagation over great distances. Thus, retransmission is extremely costly.

Modern satellite communication systems provide a pervasive and reliable infrastructure to distribute voice, data, and video signals for global exchange and broadcast of information. These satellite communication systems have emerged as a viable option to terrestrial communication systems for carrying data traffic (e.g., Internet traffic) as well as telephony traffic. However, because of spectral limitations, satellite communication systems are bandwidth constrained relative to terrestrial networks. In addition, modern data applications, which can include multimedia and real-time applications, often demand high-speed transfer of large amounts of data, such that a satellite communication system would likely be unable to service such great demands all at once. Accordingly, flow control is particularly critical between end hosts that utilize a satellite communication system as the transport network.

Traditionally, service providers have generally relied on end systems or hosts to implement flow control, without intervention by intermediate networks (e.g., transport network of the service provider). This lack of involvement is even more prevalent when the transport network is a satellite network, which traditionally acts simply as a relay.

Based on the foregoing, there is a clear need for improved approaches for flow control over a system that is bandwidth constrained and encumbered by delays.

SUMMARY OF THE INVENTION

These and other needs are addressed by the present invention, wherein an approach is provided for controlling dataflow at a transport interface within a satellite terminal (ST).

According to one aspect of the present invention, a method for providing flow control in a radio communication system is disclosed. The method includes receiving a dataflow from a host, and storing the dataflow in a queue of a system non-specific side of a transport interface. The method also includes determining whether the dataflow can be flow controlled, and if the dataflow can be flow controlled, obtaining a credit allocation corresponding to a queue of a system specific side of the transport interface. The system specific side supports a signaling function that is based on a transmission characteristic of the radio communication system. The system specific queue is designated for storing data to be transmitted over the radio communication system. The credit allocation specifies an amount of the dataflow to be sent to the system specific queue. The method further includes transferring the dataflow from the system non-specific queue to the system specific queue for transmission over a communication link established over the radio communication system.

According to another aspect of the present invention, an apparatus for providing flow control in a radio communication system is disclosed. The apparatus includes a transport interface including a system non-specific side that is associated with a queue for storing a dataflow from a host. The interface also includes a system specific side configured to generate a credit allocation specifying an amount of the dataflow to be sent to a queue of the system specific side. The system specific side supports a signaling function that is based on a transmission characteristic of the radio communication system and is associated with a queue designated for storing data to be transmitted over the radio communication system. The credit allocation specifies an amount of the dataflow to be sent to the queue of the system specific side, and the dataflow is transferred from the queue of the system non-specific side to the queue of the system specific side for transmission over a communication link established over the radio communication system.

According to yet another aspect of the present invention, a method for providing flow control in a satellite communication system is disclosed. The method includes receiving a request from a non-satellite system specific side of a transport interface for a flow control allocation that specifies an amount of data to be stored in a queue of a satellite system specific side of the transport interface, wherein the system specific side supports a signaling function that is based on a transmission characteristic of the radio communication system. In addition, the method includes generating the flow control allocation based upon availability of the queue.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method, device, and software for providing credit-based flow control in a radio communication system are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

The present invention, according to one embodiment, controls dataflow at a transport interface within a satellite terminal (ST) operating in a satellite communication system that supports spot beams. The interface has a system non-specific side that supports signaling functions that are independent from the satellite communication system. The interface also has a system specific side that takes into account the transmission characteristics of the satellite communication system. Upon receiving a dataflow from a host, the system non-specific side buffers the data flow in a queue. The ST then determines whether the dataflow can be flow controlled, and if the dataflow can be flow controlled, the system specific side supplies a credit allocation that specifies an amount of the dataflow to be sent to the system specific queue. This credit allocation can be periodically advertised to the system non-specific side. The system specific queue is designated for storing data to be transmitted over a link supported by a spot beam serving the destination terminal within the radio communication system. The credit allocation specifies the quantity of data that can be sent to the system specific queue. Under this arrangement, efficient use of network resources and fair access are achieved. Additionally, the separation (or abstraction) of the functionalities of the two sides provides modularity, and enhances flexibility in design.

Figure 1:
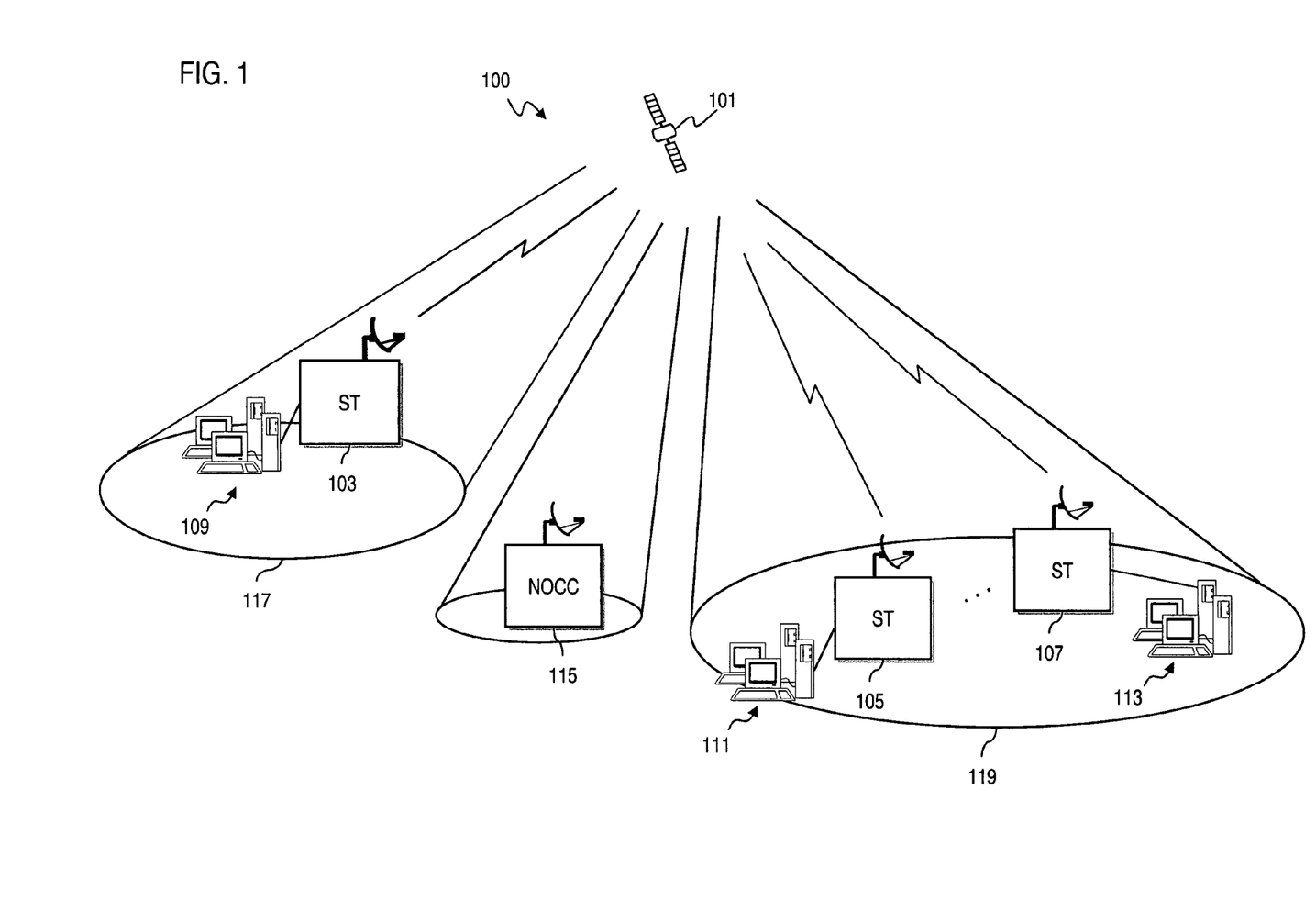
FIG. 1 is a diagram of a spot beam satellite communication system capable of providing flow control, according to an embodiment of the present invention.

FIG. 1 is a diagram of a spot beam satellite communication system capable of providing flow control, according to an embodiment of the present invention. A communication system 100 includes a processing satellite 101 that supports communication among satellite terminals (STs) 103, 105 and 107. Each of these STs 103, 105 and 107 serves hosts 109, 111 and 113, respectively. The system 100 employs Network Operations Control Center (NOCC) 115 to manage and control communication services and operations. For example, the NOCC 115 provisions and identifies the channels that are to be used for the various packet delivery services, which are supported by the system 100. These packet delivery services are more fully described below. According to one embodiment of the present invention, the system 100 possesses a flow control mechanism within the STs 103, 105 and 107 to regulate the data flow from the respective hosts 109, 111 and 113 over spot beams 117 and 119.

In the satellite system 100, as in the general packet switched data network, the fundamental principle used to increase capacity utilization is statistical multiplexing. For the purposes of explanation, the ST 103 originates data destined to ST 105. User traffic flows (dataflows), as and when they come along, are allowed to share in the system capacity dynamically according to the specific requirements of the flows, as opposed to setting aside capacity for each flow at the time of its initiation. Increased efficiency is achieved by permitting capacity that, in the circuit-switched model, would have been statically allocated for a certain dataflow, to be made available to another flow that may have short-term needs for increased capacity.

To make use of shared capacity, adaptive algorithms are generally used in the hosts 109. The most notable example is the transport level protocol, Transmission Control Protocol (TCP). TCP operates by adapting the sender application's capacity usage to the available capacity in the communication path between the sender and the receiver. If the adaptive algorithms are not implemented properly, there is the potential hazard of the input traffic on any communication link to exceed the resources of that link. It is recognized that even a single "misbehaving" application can cause any application that shares a link with that misbehaving application to suffer performance losses, and in the extreme case, complete denial of service.

In the context of the satellite system 100, the use of TCP by the hosts 109 does not suffice to provide the level of responsiveness that is needed for rate adaptation of user dataflow to perform well. The satellite round-trip delay is large enough to warrant special mechanisms to improve upon TCP performance in a satellite environment.

These special mechanisms involve the use of performance enhancing proxy (PEP) functions to address the delay issue as well as bandwidth efficiency. Such functions are detailed in co-pending patent application entitled "Method and System for Improving Network Performance Using a Performance Enhancing Proxy," (Ser. No. 09/903,832), filed Jul. 12, 2001 (incorporated herein by reference in its entirety). The TCP Performance Enhancing Proxy (PEP) is an effort towards improving TCP throughput over the satellite system 100. A PEP Backbone Protocol (PBP), which is defined as a constituent of the TCP PEP, implements a specialized protocol to mitigate the performance impact of satellite links. The flow control inherent in PBP can assist with the overall flow-control in the satellite system 100. This can be augmented, particularly with respect to fair usage. That is, there is a need to protect dataflows from other misbehaving dataflows, as well as protect a user from another user that is misbehaving. The system 100 addresses this need by utilizing a credit-based flow control mechanism at the satellite interface. This flow control mechanism, which operates at the link and network layers of the Open System Interconnect (OSI) model, can constrain resource usage (statistically or otherwise), as explained more fully with respect to FIGS. 2-5.

In an exemplary embodiment, the STs 103, 105 and 107 are Very Small Aperture (VSAT) terminals. Under this architecture, users of the hosts 109, 111 and 113 can communicate from one VSAT ST to another directly with one satellite hop. That is, the system 100 provides mesh connectivity. Unlike conventional bent-pipe satellite systems, the satellite 101 demodulates fixed-length packets that are received from STs 103, 105 and 107, queues the packets for the proper downlink spot beam based on packet header information, and then modulates the packets for transmission on the specified downlink spot beam. The satellite 101 employs spot beams 117, 119 and possesses processing functions that permit greater power and spectral efficiency than traditional bent-pipe satellites. Further, the satellite 101 can replicate individual packets that are received on the uplink and send these packets to multiple downlink spot beam destinations. In this manner, the satellite 101 can retain broad distribution capabilities of the bent-pipe satellite systems, while providing flexibility in terms of bandwidth allocations.

The satellite 101 contains a fast packet switch (FPS) (not shown) to process data packets that are exchanged across the system 100. Exemplary switches include an ATM (Asynchronous Transfer Mode) switch, and a Gigabit Ethernet switch; it is recognized by one of ordinary skill in the art that any type of switch can be utilized. The FPS transfers the packets that the payload of the satellite 101 receives on the uplinks to the proper downlinks. The payloads of satellite 101 may include other components, such as uplink antenna, down-converters, switch matrix, demodulator banks, and phased-array downlink antenna; these other components are well known, and thus, are not described in detail.

The satellite 101 performs the necessary bandwidth control functions, in conjunction with the NOCC 115. In the system 100, STs 103, 105 and 107 originate traffic from a particular coverage area and may transmit connectionless traffic as well as connection-oriented traffic. The generated traffic from these STs 103, 105 and 107 are transferred through the FPS switch and terminated at destination STs within the same and/or different coverage area. That is, the destination STs can be within the same coverage area as the originating STs. To effectively transmit traffic to the desired destination ST through the switch of the satellite 101, the STs 103, 105 and 107 transmit bandwidth requests to the satellite 101 prior to transmitting any data traffic.

The NOCC 115, which is based on the ground, provides management functions for the system 100. For example, an ST needs to obtain authorization from the NOCC 115 before making a request to the satellite 101. The NOCC 115 keeps track of the total uplink (and downlink) bandwidth available for connections and will block a connection request if there is insufficient satellite capacity available to satisfy the request.

The satellite 101 implements the bandwidth control function, which includes controlling the allocation of uplink channels and timeslots and mitigating downlink congestion. The satellite 101 examines the requested bandwidth and replies with grants based on downlink resource availability, as determined by a congestion avoidance logic (not shown) and uplink resource availability. The congestion avoidance logic regulates the amount of traffic received by the switch through, for example, TDMA (Time Division Multiple Access)/FDMA (Frequency Division Multiple Access) uplink channels via request/grant bandwidth control processes.

The STs 103, 105 and 107, in general, can submit rate requests as well as volume requests, depending on the mode of operation (i.e., the type of traffic the ST is processing). Rate requests specify the number of slots in each uplink frame that an ST (e.g. 103) needs to meet the uplink demands for a relatively constant traffic (e.g., connection-oriented). A rate request results in the allocation of a constant number of slots each frame, spread out as evenly in time as possible, which the ST (e.g. 103) can use to send packets at a constant rate. The requesting ST (e.g. 103) gets a constant allocation of that uplink capacity every frame until the request is cancelled by the ST (e.g. 103) via a de-allocation message to the satellite.

Volume requests specify the number of uplink slots that an ST (e.g. 103) requires to send a specific number of packets to another ST (e.g., ST 103). The requesting ST (e.g. 103) receives a periodic allocation of one or many slots within a specific frame until the entire number of slots requested has been allocated. Volume requests are used by the ST (e.g. 103) to send a burst (one or many) of data packets on the uplink. Several volume requests may be transmitted by the ST (e.g. 103) in a short period of time to send a file that has hundreds of data packets (e.g., segmented IP (Internet Protocol) packets) to another ST (e.g. 105, 107, and 109).

The bandwidth request operation is performed by an ST (e.g. 103) that transmits data using a rate request during one session and a volume request during another session. A satellite terminal transmits a bandwidth request message to the satellite over a contention channel. Based on the current traffic load, the satellite 101 may dynamically assign some of the uplink channels on a frame-by-frame basis to change the designation of these uplink channels from data channels to contention channels. Thus, when the traffic on the data channels is light, the satellite 101 can assign most of the data channels to be used as contention channels, thereby reducing the collision rate for contention accesses by the STs. In other words, as traffic on data channels increases, the satellite 101 can change contention channels into data channels, as appropriate. This advantageously permits a more efficient use of satellite capacity, in that as the load increases, fewer channels are dedicated to receiving new bandwidth request messages.

Upon receiving the bandwidth request message and after determining that bandwidth is available, the satellite 101 sends a rate allocation every frame to provide the ST (e.g. 103) with a fixed number of time slots that the ST (e.g. 103) can transmit into that frame. Specifically, the satellite 101 allocates uplink slots in response to bandwidth requests from STs in each uplink beam once every frame and sends rate allocations to the STs in these downlink cells once per frame using allocation messages. Sending rate allocations every frame allows the satellite 101 to move rate allocation slots within a channel or to another channel to "defragment" the rate allocations.

According to one embodiment, the satellite 101 packs allocations for several STs into each allocation message to preserve downlink bandwidth. The satellite 101 addresses allocation messages to a dedicated multicast group address so that these packets can be processed by all of the STs in the uplink cell that are waiting for slot allocations. These STs process every allocation message that they receive to find the ones that contain their own destination addresses and their corresponding allocations.

Rate requests, according to an embodiment of the present invention, are acknowledged by the satellite 101 in one of two ways, rate allocation within an allocation message or rate denied within an acknowledgement message. As used herein, the term assignment messages refer to both allocation messages and acknowledgement messages; an acknowledgement message effectively is a denial of the request (i.e., no slots have been allocated). If an ST (e.g. 103) receives a request denied response to a rate request, the ST (e.g. 103) notifies the NOCC 115, which then determines the course of action. Rate requests are de-allocated (released) by the ST (e.g. 103) when the ST (e.g. 103) has completed its transmission. Rate de-allocated messages from the ST (e.g. 103) are not acknowledged by the satellite 101. The ST (e.g. 103) monitors the multicast allocation message from the satellite 101 to determine that the rate was de-allocated. The NOCC 115 can also de-allocate a rate request for an ST (e.g. 103).

The size of rate requests can be increased or decreased by sending a rate change request specifying a different number of slots per frame. The change request is sent using an allocation from the original rate request. If the rate change is granted, the ST (e.g. 103) receives an allocation for the new rate within a multicast allocation message. If the rate change is denied, the ST (e.g. 103) receives a multicast acknowledgement message indicating the denial. The satellite 101 does not de-allocate the original rate request until the satellite 101 has successfully processed and allocated the changed rate request.

An ST (e.g. 103) that does not receive a multicast packet with its allocation (due to a rain fade, etc.) cannot transmit. The ST (e.g. 103) must wait until a multicast is received that specifies the allocation to resume transmission.

Successive rate allocations provide the ST (e.g. 103) with the same number of time slots in a frame; however, the channel and slot locations for that allocation may be changed. Upon receiving the rate allocation, the ST (e.g. 103) can begin transmitting data. Thus, an ST (e.g. 103) may send a packet burst into a timeslot on a data channel only if the ST (e.g. 103) has sent a request message to the satellite 101 and has received an allocation from the satellite 101 authorizing the ST (e.g. 103) use of specific timeslots on a particular channel. It should be noted that the data channels experience no collisions because the satellite 101 only allocates a timeslot on a data channels to a single ST (e.g. 103). The rate allocation remains until the ST (e.g. 103) sends a bandwidth release packet. Initial bandwidth requests for a rate allocation are typically sent on a contention channel. However, the release packet, which de-allocates a rate, can be sent within the rate allocation that is being de-allocated.

Figure 2:
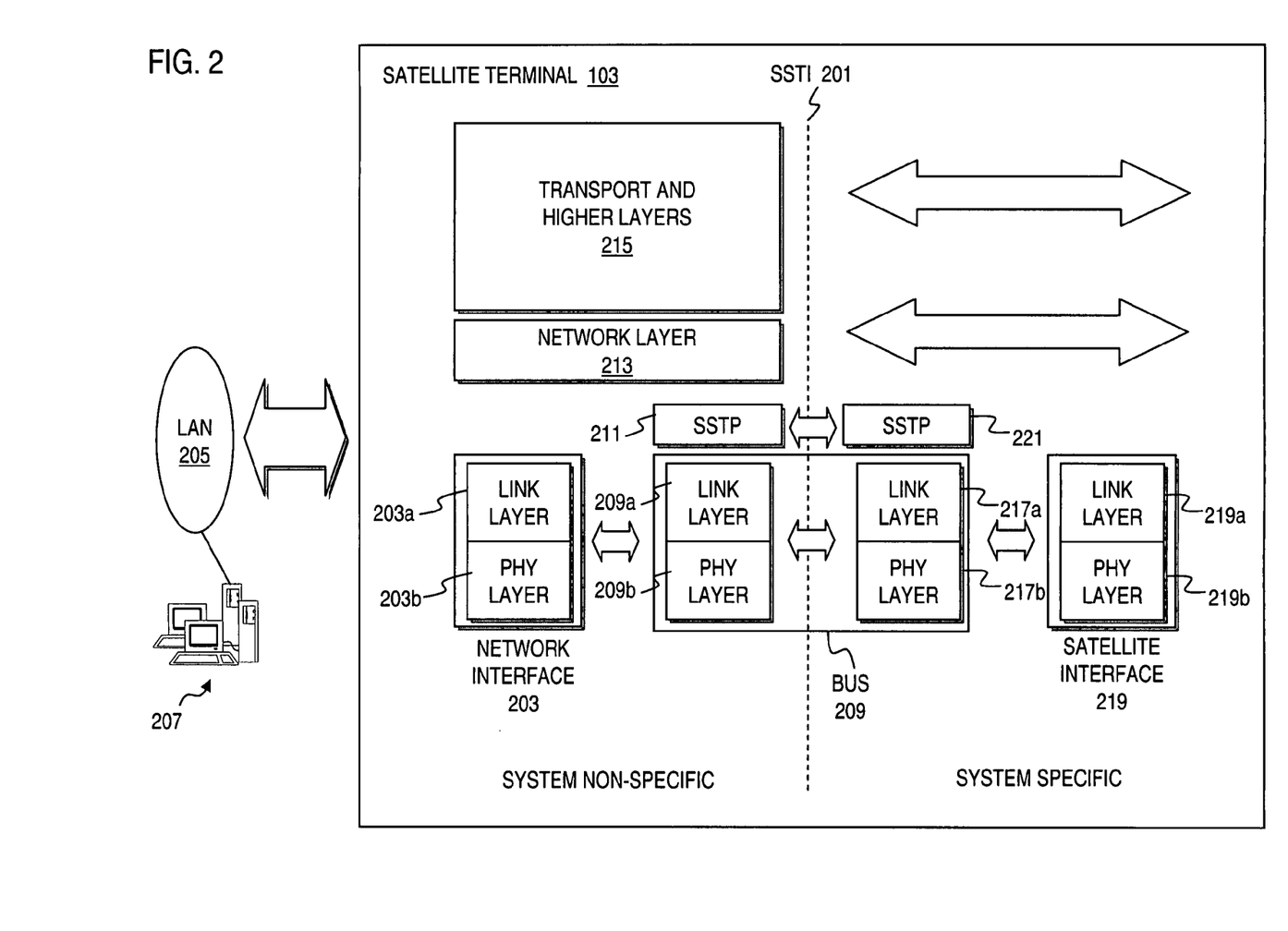
FIG. 2 is a diagram of an architecture of a satellite terminal (ST) of FIG. 1 for providing credit-based flow control, according to an embodiment of the present invention.

FIG. 2 is a diagram of an architecture of a satellite terminal (ST) of FIG. 1 for providing credit-based flow control, according to an embodiment of the present invention. As shown, the ST 103 includes a variety of functional components that are separated according to functions that are non-specific to the satellite system and those functions that are tailored to transmission of data over the satellite 101 e.g., satellite radio technology and link characteristics). The interface 201 between the system non-specific functions and the system specific functions is referred to as the Satellite System Transport Interface (SSTI). The flow control mechanism, according to an embodiment of the present invention, concerns regulating dataflows across the SSTI 201. The SSTI 201 implements, among other functions, a scheme of flow control using a system of credits, for explicit control of shared buffer usage by the user ports (not shown). Credit-based flow control serves not only to fairly partition transmission resources between multiple user ports, but also to (implicitly) signal congestion level in the system.

The system non-specific side of the ST 103 includes a network interface 203 with a physical layer 203a and a link layer 203b for communicating with a data network, such as local area network (LAN 205), which serves one or more hosts 207. The network interface 203 couples to a bus 209 (e.g., a Peripheral Component Interconnect (PCI) bus) that also supports a physical layer 209a and a link layer 209b.

Within this system non-specific side, a Satellite System Transport Protocol (SSTP) layer 211 resides above the link layer. The SSTP layer 211 provides a logical partitioning of functions between satellite system specific capabilities and system non-specific capabilities. The SSTP layer 211 defines a family of peer-to-peer protocols that operate across the SSTI and specifies data, signalling, and management planes. In the OSI model, the SSTP layer 211 is positioned between the network layer 213 and the link layer 209a. The link layers 209a, 217a and the physical layers 209b, 217b permit the two SSTP entities to communicate with each other. Atop the SSTP layer 211 includes a network layer 213 and transport and other higher layers 215.

The bus 209 couples to a satellite interface 219, which also provides a link layer 219a and a physical layer 219b. The system specific side further includes a SSTP layer 221, which in an exemplary embodiment, includes a Network Adaptation Layer (NAL).

The NAL adapts network-layer packets to suit link-layer specifics. The NAL can receive Internet Protocol (IP) packets and interprets, if present, Class of Service (CoS) tags to parse the incoming packet stream to flows corresponding to data transport services supported by the satellite system. These transport services can include a Constant Rate service, a Variable Rate service, etc.

The SSTI level flow control provides performance optimization, efficient capacity utilization and fair access to the system 100, while minimizing overhead and signaling requirements. The flow control mechanism operates between the system specific side and the system non-specific side to provide efficient capacity utilization and performance optimization. Performance optimization dictates flow-control operation be implemented in a manner such that end-user's perception of performance is optimized—within the constraints of capacity availability. Fair access requires the flow control mechanism to be able to implement a policy for capacity partitioning among various users of the shared service. Users must be shielded from being impacted adversely by a misbehaving user. Similarly, it must be possible to shield various classes of service offered to a single user from each other.

Efficient capacity utilization can be viewed as maximizing throughput within the constraints of available capacity. This requires the flow control signaling to be able to indicate to the users the availability of transmission resources available to the server as promptly as possible. Such flow control mechanism prevents over-allocation of capacity to any user that may result in wasted resources; such over-allocation can deprive another user in need of capacity. Consequently, when several users are contending for limited amount of shared buffer space, the allocation of buffer space to any user must not exceed the buffering space required to be able to service the user at the available rate. Otherwise, the over-allocation may deny another user from using the resource, and thus from maximally utilizing system capacity.

Further, user packets must rarely be dropped after accepting them from clients, since dropped packets will mostly need to be retransmitted. This behavior is particularly undesirable in that these packets will waste system capacity along the entire path to the receiver. Retransmissions should be avoided since they contribute to congestion, negatively impacting end-user experience.

This credit-based flow control scheme uses flow control signaling messages to express demands and grants in the form of credits, where each credit pertains to a fixed amount of data which can be accommodated in the system specific side. However, this explicit allocation of buffer space is performed periodically, and the credit grants to the user ports remain active throughout this fixed time-period. In an exemplary embodiment, credit allocations are provided every "superframe." However, even though credit allocations are made every superframe (e.g., 768 ms), the allocation can reflect the amount of data that may be sent by the users every uplink frame (96 ms). Thus, the allocations may be considered as specifying the rate at which data may be sent in the form of credits per uplink frame. The granularity of control in the time domain relates to the fairness issue, since the capacity partitioning can only be fair within an interval equal to the time-interval between two successive credit allocations.

The SSTI flow control scheme is more fully described below with respect to FIG. 3.

Figure 3:
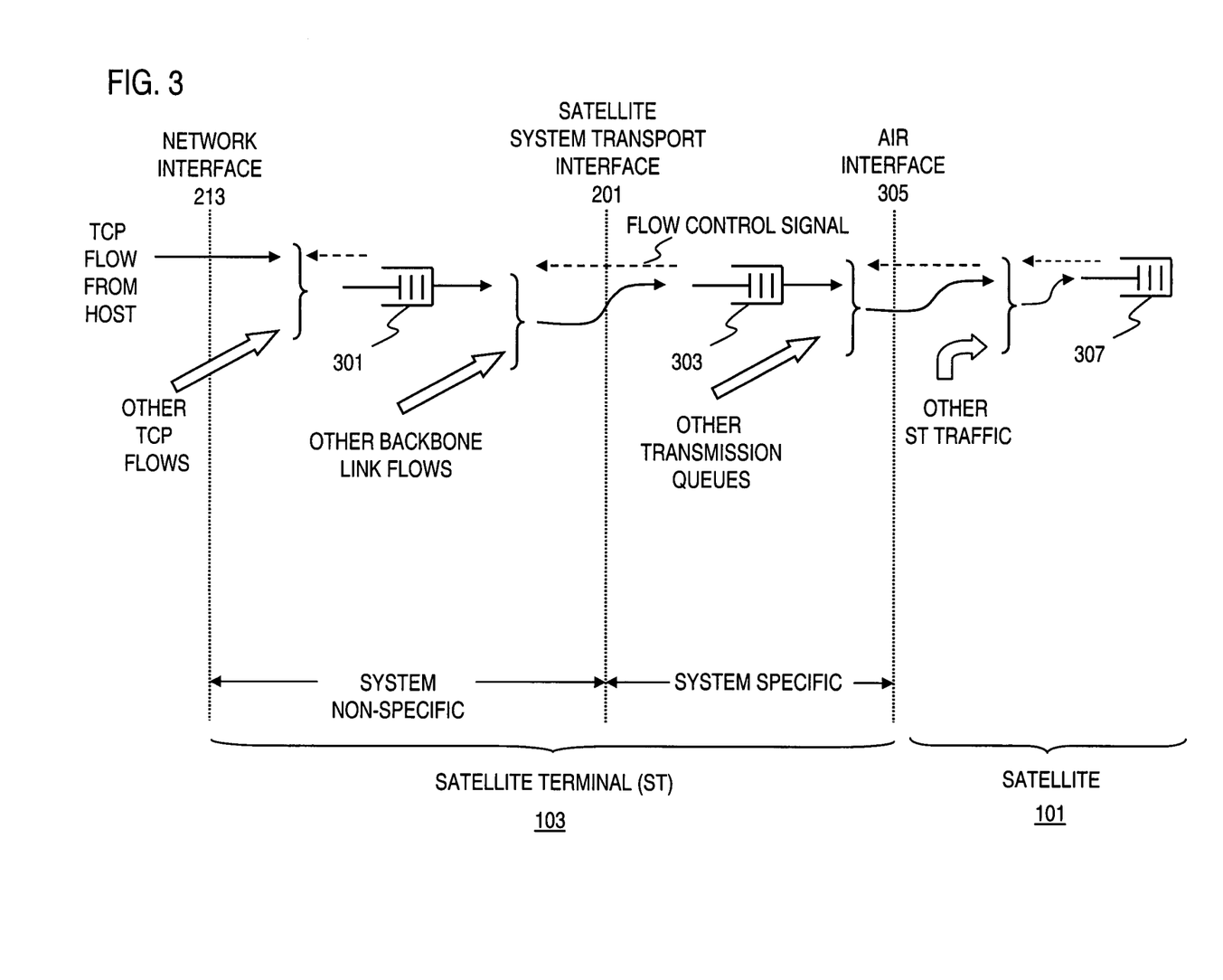
FIG. 3 is a diagram of a queuing system for providing flow control, in accordance with an embodiment of the present invention.

FIG. 3 is a diagram of a queuing system for providing flow control, in accordance with an embodiment of the present invention. As described, the SSTI 201 abstracts the satellite system specific characteristics from the generic networking functions in the terminal 103. This abstraction allows a decoupled implementation of the generic functions (i.e., the system non-specific side) from the satellite specific functions. This decoupling advantageously permits separate and independent development of the system non-specific and system specific functions. Non-link specific functions can be easily ported to new satellite systems with different link conditions. It is recognized that a flow control mechanism is needed at the SSTI 201 because of the difference between the bandwidth demands of the non-specific side and the bandwidth capabilities which the specific side can provide the non-specific side.

For the purposes of explanation, FIG. 3 shows a simplified queueing model to describe the SSTI flow control mechanism supported by the ST 103 of FIG. 2. By way of example, TCP flows are discussed, as such flows are capable of being flow controlled. In an exemplary embodiment, the dataflow are spoofed TCP flows. Under this scenario, a host (e.g., one of the hosts 207 of FIG. 2) originates a stream of data (i.e., dataflow) to the ST 103. The ST 103 employs a queue-301 to store the incoming dataflow on the system non-specific side. As shown, the non-specific system queue 301 can accept traffic from multiple sources. In particular, the queue 301 is used to queue traffic from multiple sources mapped to the same backbone link.

In an exemplary embodiment, a separate queue is maintained for each combination of credit ID and destination satellite terminal. Each such combination has a separate queue because flow control is performed both within the terminal, to avoid overwhelming the satellite communications system, and between the source and destination satellite terminals 103, 105 and 107. Flow control within the terminal is accomplished whereby each credit allocation is associated with traffic which, according to the system, should be flow-controlled identically. Flow control between the terminals is accomplished by a protocol operated between the system-non-specific parts of satellite terminals, as more fully described with respect to FIG. 4.

The stored dataflow, along with other flows for transmission over a backbone link, are then forwarded across the SSTI 201 to a system specific queue 303 (also denoted as "transmission queue"). That is, the queue 303 is used to queue traffic associated with multiple backbone links, e.g., to different terminals served by the same downlink spot beam. Backbone link flows refer to traffic that is to be transported over a communication link within the satellite communication system 100. In an exemplary embodiment, the dataflows are backbone connections supporting TCP connections. These flows are multiplexed and then sent over an air interface 305 to the satellite 101, which includes a queue 307 for storing the flows from the ST 103 in addition to other STs.

Flow control is necessary at the SSTI 201 because the input rate via this interface 213 into the terminal 103 may far exceed the output rate available to the terminal 103. Also, because of the large transmission delays inherent in the transport medium (e.g., a geostationary satellite network), complete reliance on higher layer flow control features would be inefficient and inadequate, under the assumptions of bounded buffer space at the terminal 103. Accordingly, the SSTI level flow control would be to (implicitly) back-propagate the flow control information obtained from the system specific side to the users (e.g., via user ports or individual user dataflows). This back-propagation is illustrated by dashed arrows, whereby a flow control signal is sent from the system specific side to the system non-specific side; in turn, this information is conveyed to the originating hosts (e.g., hosts 109). End to end back-propagation of flow control signals can be achieved by a receive TCP client advertising a window size commensurate with the receive buffer capacity. This TCP client can reside within the system non-specific side of the ST 103, and can effectively operate between the network interface 213 and the queue 301.

Figure 4:
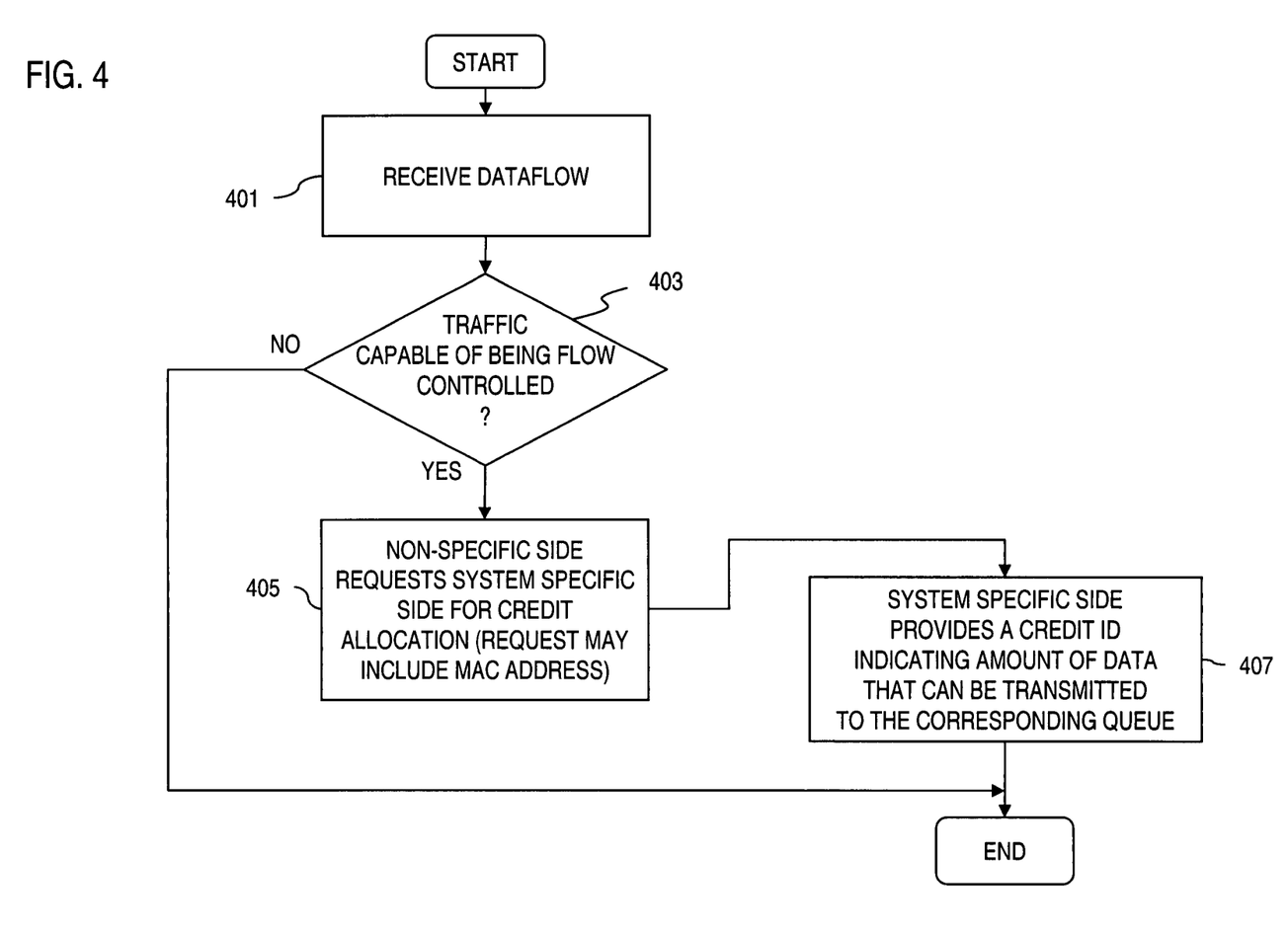
FIG. 4 is a flow chart of the flow control mechanism of the system of FIG. 1.

FIG. 4 is a flow chart of the flow control mechanism of the system of FIG. 1. Continuing with the example of FIG. 3, in step 401, the ST 103 receives a dataflow, which is mapped to an existing backbone link over the satellite communication system 100. If the appropriate backbone line (e.g., correct destination ST for the correct class of service), then the backbone link is established. Next, the ST 103 determines whether the traffic is capable of being flow controlled, per step 403. A controllable flow comprises of one or more user data transport flows; multiple dataflows are typical if the link constitutes a backbone link (as is the case in this example). If the determination is in the affirmative, the system non-specific side requests a credit allocation from the system specific side. At this point, the system non-specific side registers the dataflow with the system specific side to obtain a flow control index, i.e. a Credit-ID, for the dataflow, as explained below. According to one embodiment of the present invention, as part of this request to the system-specific part, a system-specific destination Medium Access Control (MAC) address may be supplied, if necessary, so that the system-specific part can determine the appropriate Credit ID. Such addressing is learned by the non-specific part in advance of the request.

Figure 5:
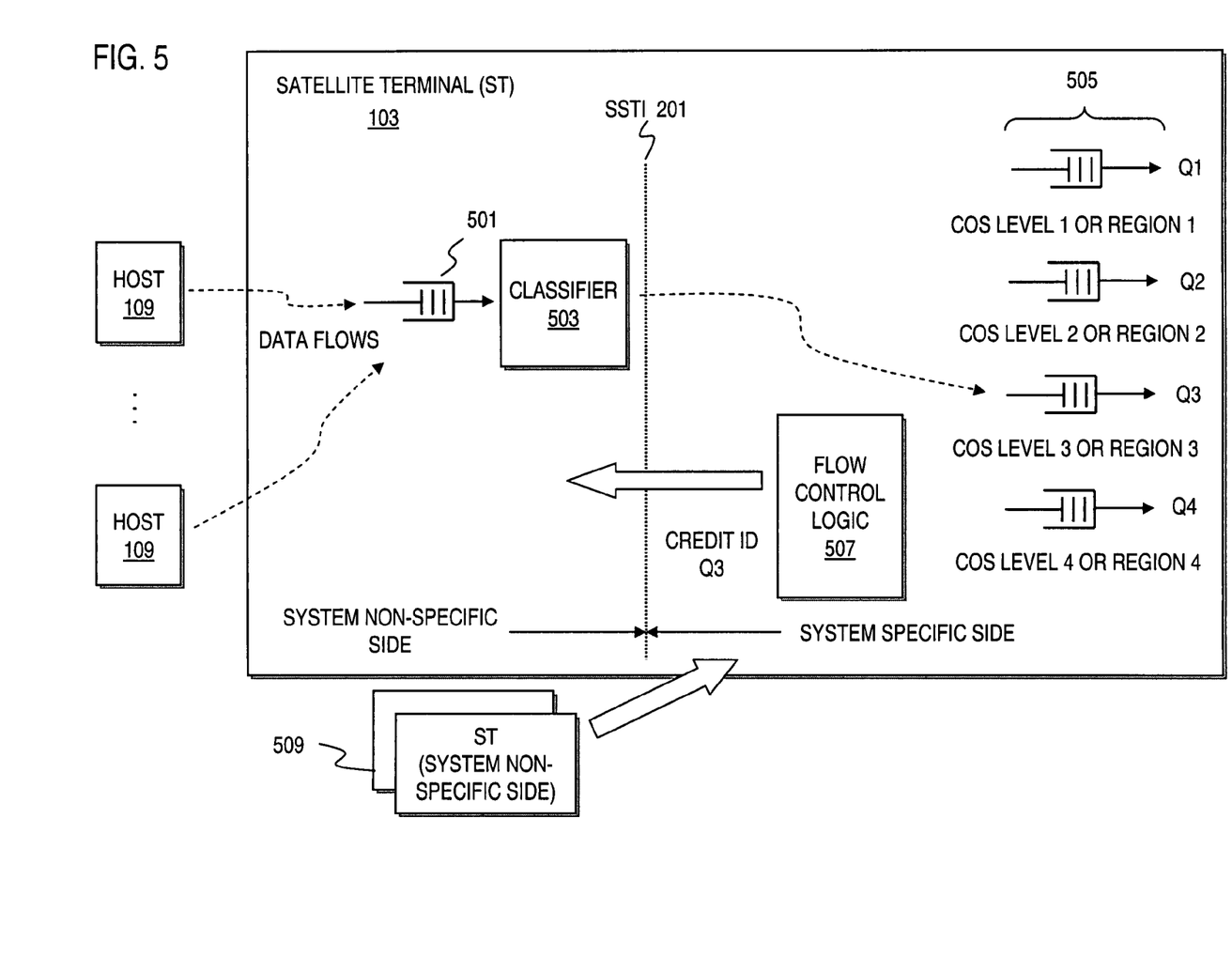
FIG. 5 is a diagram of a ST capable of providing credit-based flow control based upon classes of service (CoS) or a destination region, according to one embodiment of the present invention.

During step 405, the ST 103 can optionally specify a class of service (CoS) parameter by which to treat the dataflow. The system specific side of the ST 103 can utilize multiple transmission queues corresponding to the differing classes of service or a destination region, as shown in FIG. 5.

In step 407, the non-specific side provides the system specific side with the Credit ID (i.e., flow control index) corresponding to a queue designated for transmission to the destination terminal. The Credit ID specifies the amount of the dataflow to be sent to the system specific queue associated with the Credit ID.

It is contemplated that the credit allocation request or demand can be individually conveyed or batched to the system specific side. In one embodiment of the present invention, this batch process is performed once every "superframe." That is, periodically, the demands for bandwidth are issued by the system non-specific side, and the system specific side responds with Credit-IDs. By way of example, the demand for bandwidth can be in units of bytes, and the response is also in bytes, with the minimum grant for a full Maximum Transmission Unit (MTU) of data (e.g., 1500 bytes). The MTU represents the largest unit of data that can be supported by a particular medium.

On receiving credit requests (or demands) from the system non-specific side, the system specific side performs credit allocations to all Credit-IDs for all dataflows, and advertises these credit allocations to the system non-specific side. A credit-allocation is advertised for each valid Credit-ID assigned, and represents the amount of data that is permitted into the system specific side for that Credit-ID in each uplink frame period, until the start of the next credit reporting interval. Within the system non-specific side, the unique Credit-ID is assigned to each queue serving flow-controllable data to a distinct combination of downlink region and traffic priority. The system non-specific side can associate a Credit ID with multiple queues, where each queue corresponds to a combination of a destination terminal and a traffic priority/class of service. Accordingly, several controllable flows within the system non-specific side may be assigned the same Credit-ID. Through the use of the Credit-ID, the system specific side can indicate the amount of data that can be accommodated from the particular queue. For instance, a credit can represent a fixed amount of data, such as a single byte.

According to one embodiment of the present invention, the credit requests (or demands) express the instantaneous amount of data backlogged at the system non-specific side for each Credit-ID. Alternatively, the system non-specific side can report an estimate of the arrival rate of each flow in the credit demand, rather than the instantaneous backlog of the flow. The estimate of the arrival rate may be computed by the system specific side using the information on instantaneous backlog reported by the system non-specific side in the demands. Because a Credit-ID may map to multiple controllable flows at the system non-specific side, the credit demand for a Credit-ID can include the sum total of the data backlogged in all the connections (e.g., PBP connections) mapping to the same Credit-ID. The credit demand can also be an estimate of data expected to arrive during the next credit reporting interval (based upon recently-observed arrival rate) plus the backlog at that time, or some other kind of estimate. That is, a combination of data arrival/backlog quantities observable within/by the system non-specific side can be used to formulate the credit demand.

Fair partitioning of available credits among the flows mapping to the same Credit-ID is ensured by use of a fair scheduling mechanism, such as a round-robin scheme, within the system-specific side.

The system non-specific side may not send more data for any Credit-ID in any frame than the credit allocation made for the Credit-ID for a current credit reporting interval. Any data over and above this limit may be dropped by the system specific side. It is noted that since credit-allocations to the system non-specific side need not be in terms of user data packets, but rather a byte or a multiple thereof, allocations may fall short of enabling a user data packet to be sent by a few bytes. Under such circumstances the system non-specific side may, nonetheless, send the affected user data packet across the backbone link. The system specific side can try to accommodate this behavior by ensuring that it is able to accept user data that exceeds the allocation by one network layer packet.

To allow the system non-specific side to service a new flow when in the middle of a credit reporting interval, a special "wild-carded" credit allocation can be made by the system specific side. This special allocation need not apply to any single Credit-ID, but can be applicable to all Credit-IDs for which a credit demand was not reported by the system non-specific side, and consequently for which an explicit credit allocation was not made in the last credit advertisement by the system specific side. Rules for credit validity applied to the non-wild-carded situation also applies to the wild-carded allocation. The wild-carded allocation may be divided up by the system non-specific side among the flows as appropriate. The wild-carded allocation may be used to service flows for which a null credit demand was reported in the last credit report, which includes new flows for which a credit demand was not reported at all.

For the system 100, it is contemplated that the mapping of downlink cells to downlink regions can change during normal operation. It is noted that the notion of a downlink region involves one or more downlink cells being aggregated for treatment as a single geographical unit for, e.g., congestion control purposes. Such change can stem from time of day profile changes, for example. When this happens, the mapping of user flows to Credit-IDs may need to be changed.

Under such circumstances the system specific side would signal to the system non-specific side the invalidity of all the previous flow to Credit-ID mappings. Consequently, the system non-specific side re-registers all controllable flows with the system specific side and obtains valid Credit-IDs for them. Until the system non-specific side receives a subsequent credit allocation message for the new Credit-IDs, it may not use the prior credit allocations to serve any data; i.e., all prior credit allocations are voided.

FIG. 5 is a diagram of a ST capable of providing a credit-based flow control based upon classes of service (CoS) or a destination region, according to one embodiment of the present invention. In this example, the ST 103 includes a queue 501 that stores dataflows within the system non-specific side. Because memory is limited, adaptive buffer allocation is utilized to allow any single flow to peak to the full channel rate. Such an adaptive buffer allocation scheme allows a fast ramp up of a flow, such that an idle flow may peak to the full channel rate in a short time.

The ST 103 also includes a classifier 503 to provide prioritization of the dataflows, whereby the dataflows are transferred from the system non-specific queue 501 to a Class of Service (CoS) or a destination region queue 505. Although the queue 505 is shown as corresponding to the different CoS levels or a destination regions (which in this example is illustrated as four levels), the queue 505 can be implemented on a single memory block. In fact, all the queues 501, 505 can reside on a single memory block.

As seen in FIG. 5, the dataflows from hosts 109 are classified into a CoS level 3. As a result, a flow control logic 507 generates a Credit ID of Q3 to indicate to the system non-specific side that the received dataflows will be forward to queue Q3 for transmission. The Credit ID identifies a dataflow as belonging to a particular satellite region and a particular Class of Service. At startup of the SSTI 201, the system specific side sends a region mapping message to the system non-specific side so that Credit IDs can be mapped locally by the system non-specific side. Because multiple backbone connections can be associated with the same credit ID, the flow control logic 507 assigns one Credit ID per region and Class of Service. In this manner, the flow control logic 507 ensures fairness among user ports (not shown), and between different user priorities of data, while providing protection to flows from each other.

As mentioned, the dataflows can be TCP connections that are multiplexed onto the same backbone link. Consequently, there is a need for fairness in servicing of these competing TCP connections. A "misbehaving" TCP flow should not be able to degrade servicing of other flows competing for resources of the common backbone link. This can be achieved by constraining the TCP window advertised for each TCP connection to its fair share of the shared buffer capacity of the backbone link. It should be noted, though, that this mechanism by itself may not be able to guarantee that competing flows will be served at identical rates, data can still be served at a higher rate from a connection that experiences less latency on the terrestrial segment between the source and the downstream terminal.

Further, in accordance with one embodiment of the present invention, the system specific side of the ST 103 can serve the system non-specific sides of other STs 509. This capability (referred to as "homing) enhances redundancy and system reliability. The system non-specific side communicates with its "homed" system specific side to get services that are provided by the system specific side. For management and signalling, a system non-specific side is homed to one and only one system specific side, according to an embodiment of the present invention.

Figure 6:
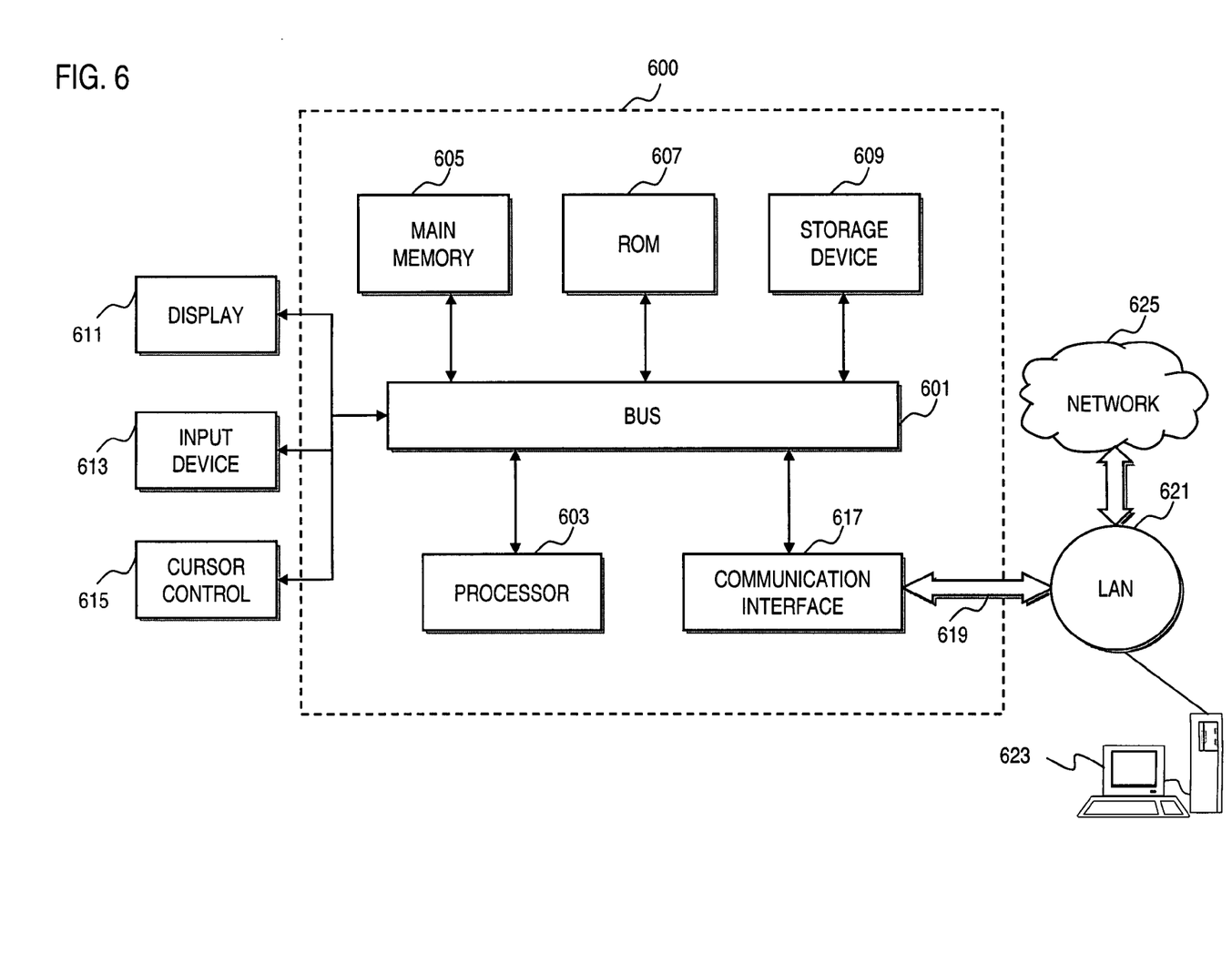
FIG. 6 is a diagram of a computer system that can perform credit-based flow control, in accordance with an embodiment of the present invention.

FIG. 6 illustrates a computer system 600 upon which an embodiment according to the present invention can be implemented. The computer system 600 includes a bus 601 or other communication mechanism for communicating information, and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions to be executed by the processor 603. The computer system 600 further includes a read only memory (ROM) 607 or other static storage device coupled to the bus 601 for storing static information and instructions for the processor 603. A storage device 609, such as a magnetic disk or optical disk, is additionally coupled to the bus 601 for storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is cursor control 615, such as a mouse, a trackball, or cursor direction keys for communicating direction information and command selections to the processor 603 and for controlling cursor movement on the display 611.

According to one embodiment of the invention, the flow control process of FIG. 4 is provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, or a telephone modem to provide a data communication connection to a corresponding type of telephone line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by service provider. The local network 621 and network 625 both use electrical, electromagnetic, or optical signals to convey information and instructions. The signals through the various networks and the signals on network link 619 and through communication interface 617, which communicate digital data with computer system 600, are exemplary forms of carrier waves bearing the information and instructions.

The computer system 600 can send messages and receive data, including program code, through the network(s), network link 619, and communication interface 617. In the Internet example, a server (not shown) might transmit requested code belonging to an application program for implementing an embodiment of the present invention through the network 625, local network 621 and communication interface 617. The processor 603 may execute the transmitted code while being received and/or store the code in storage device 69, or other non-volatile storage for later execution. In this manner, computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as storage device 609. Volatile media include dynamic memory, such as main memory 605. Transmission media include coaxial cables, copper wire and fiber optics, including the wires that comprise bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the above approach provides flow control in a spot beam satellite communication system. A request is received from a non-satellite system specific side for a flow control allocation that specifies an amount of data to be stored in a queue of a satellite system specific side. The system specific side supports a signaling function that is based on a transmission characteristic of the radio communication system. The flow control allocation is generated by system specific side based upon availability of the queue. This approach advantageously minimizes bandwidth waste due to retransmissions, and ensures fair access to network resources.

While the present invention has been described in connection with a number of embodiments and implementations, the present invention is not so limited but covers various obvious modifications and equivalent arrangements, which fall within the purview of the appended claims.

What is claimed is:

1. A method for providing flow control in a communication system, the method comprising:
receiving a dataflow at a satellite terminal from a host;
storing the dataflow in a queue of a system non-specific side of a transport interface of the satellite terminal;
determining at the satellite terminal whether the dataflow can be flow controlled;
if the dataflow can be flow controlled, obtaining a credit allocation corresponding to a queue of a system specific side of the transport interface,
wherein the system specific side is configured to directly communicate over a satellite link of the communication system, and wherein the system specific queue is configured for storing data to be transmitted over the satellite link, and the credit allocation specifies an amount of the dataflow to be sent to the system specific queue, and
wherein the system non-specific side of the transport interface includes a transport protocol layer configured to define protocols that operate across the transport interface, and to provide a logical partitioning of processes between satellite system specific characteristics and system non-specific characteristics of the communication system; and
transferring the dataflow, based at least in part on the credit allocation, from the system non-specific queue to the system specific queue for transmission over the satellite link.

2. A method according to claim 1, wherein the system specific queue is one of a plurality of system-specific queues corresponding to a plurality of classes of service or a destination region.

3. A method according to claim 2, further comprising:
classifying the dataflow according to one of the classes of service, wherein the system specific queue corresponds to the one class of service.

4. A method according to claim 1, wherein the dataflow includes spoofed traffic.

5. A method according to claim 1, wherein the communication system is a satellite network supporting a downlink spot beam, and the satellite link is associated with the downlink spot beam.

6. A method according to claim 1, further comprising:
periodically outputting the credit allocation to the system non-specific side.

7. A method according to claim 1, further comprising:
receiving information from the system non-specific side on arrival rate of the dataflow, wherein the credit allocation is based, in part, on the arrival rate information.

8. A method according to claim 1, wherein the system specific side determines the credit allocation based on a Medium Access Control (MAC) address.

9. A non-transitory computer-readable storage medium bearing instructions for providing flow control in a radio communication system, said instruction, being arranged, upon execution, to cause one or more processors to perform the method of claim 1.

10. A method according to claim 1, wherein one queue is maintained for each dataflow with a flow control index associated with the credit allocation, a destination satellite terminal, and a traffic priority.

11. A method according to claim 10, wherein a flow control index is mapped to a plurality of dataflows at the system non-specific side.

12. An apparatus for providing flow control in a communication system, the apparatus comprising:
a flow control logic configured to determine whether a dataflow from a host can be flow controlled; and
a transport interface including,
a system non-specific side that includes a queue for storing the dataflow, and
a system specific side configured to generate a credit allocation specifying an amount of the dataflow to be sent to a queue of the system specific side, wherein the system specific side is configured to directly communicate over a satellite link of the communication system, and wherein the system specific queue is configured for storing data to be transmitted over the satellite link,
wherein the system non-specific side of the transport interface includes a transport protocol layer configured to define protocols that operate across the transport interface, and to provide a logical partitioning of processes between satellite system specific characteristics and system non-specific characteristics of the communication system, and
wherein the dataflow is transferred from the system non-specific queue to the system specific queue for transmission over the satellite link.

13. An apparatus according to claim 12, wherein the system specific queue is one of a plurality of system-specific queues corresponding to a plurality of classes of service or a destination region.

14. An apparatus according to claim 13, further comprising:
a classifier configured to classify the dataflow according to one of the classes of service, wherein the queue of the system specific side corresponds to the one class of service.

15. An apparatus according to claim 12, wherein the dataflow includes spoofed traffic.

16. An apparatus according to claim 12, wherein the communication system is a satellite network supporting a downlink spot beam, and the satellite link is associated with the downlink spot beam.

17. An apparatus according to claim 12, wherein the credit allocation is periodically output to the system non-specific side.

18. An apparatus according to claim 12, wherein the credit allocation is based, in part, on arrival rate information associated with the dataflow, the arrival rate information being provided by the system non-specific side.

19. A method for providing flow control in a communication system, the method comprising:
receiving a request, at a satellite system specific side of a transport interface within a satellite terminal, for a flow control credit allocation that specifies an amount of a dataflow to be transmitted over a satellite link of the communication system, wherein the request is received from a non-satellite system specific side of the transport interface;
determining whether the dataflow can be flow controlled, wherein the satellite system specific side is configured to directly communicate over the satellite link, and
wherein the non-satellite system specific side of the transport interface includes a transport protocol layer configured to define protocols that operate across the transport interface, and to provide a logical partitioning of processes between satellite system specific characteristics and system non-specific characteristics of the communication system; and
generating the flow control credit allocation based upon availability of a transmission queue of the a satellite system specific side of the transport interface.

20. A method according to claim 19, wherein the transmission queue is one of a plurality of satellite system-specific queues corresponding to a plurality of classes of service or a destination region.

21. A method according to claim 20, further comprising:
classifying the data according to one of the classes of service, wherein the transmission queue corresponds to the one class of service.

22. A method according to claim 19, wherein the dataflow is spoofed.

23. A method according to claim 19, wherein the satellite communication system utilizes a plurality of downlink spot beams, the transmission queue being assigned to a particular one of the downlink spot beams.

24. A method according to claim 19, further comprising:
periodically outputting a credit allocation to the non-satellite system specific side.

25. A method according to claim 19, further comprising:
receiving information from the non-satellite system specific side on arrival rate of the dataflow, wherein a credit allocation is based, in part, on the arrival rate information.

26. A method according to claim 19, wherein the flow control allocation is generated based on a Medium Access Control (MAC) address corresponding to the queue.

27. A non-transitory computer-readable storage medium bearing instructions for providing flow control in a satellite communication system, said instruction, being arranged, upon execution, to cause one or more processors to perform the method of claim 19.

28. A method for providing flow control in a wireless communication system, the method comprising:
receiving a dataflow at a wireless communication terminal from a host;
storing the dataflow in a queue of a system non-specific side of a transport interface of the wireless communication terminal;
determining at the wireless communication terminal whether the dataflow can be flow controlled;
if the dataflow can be flow controlled, obtaining a credit allocation corresponding to a queue of a system specific side of the transport interface,
wherein the system specific side is configured to directly communicate over a wireless link of the wireless communication system, and wherein the system specific queue is configured for storing data to be transmitted over the wireless link, and the credit allocation specifies an amount of the dataflow to be sent to the system specific queue, and
wherein the system non-specific side of the transport interface includes a transport protocol layer configured to define protocols that operate across the transport interface, and to provide a logical partitioning of processes between wireless system specific characteristics and system non-specific characteristics of the wireless communication system; and
transferring the dataflow, based at least in part on the credit allocation, from the system non-specific queue to the system specific queue for transmission over the wireless link.

29. An apparatus for providing flow control in a wireless communication system, the apparatus comprising:
a flow control logic configured to determine whether a dataflow from a host can be flow controlled; and
a transport interface including,
a system non-specific side that includes a queue for storing the dataflow, and
a system specific side configured to generate a credit allocation specifying an amount of the dataflow to be sent to a queue of the system specific side, wherein the system specific side is configured to directly communicate over a wireless link of the wireless communication system, and wherein the system specific queue is configured for storing data to be transmitted over the wireless link,
wherein the system non-specific side of the transport interface includes a transport protocol layer configured to define protocols that operate across the transport interface, and to provide a logical partitioning of processes between wireless system specific characteristics and system non-specific characteristics of the wireless communication system, and
wherein the dataflow is transferred from the system non-specific queue to the system specific queue for transmission over the wireless link.

* * * * *